(12) United States Patent
Shimura et al.

(10) Patent No.: US 9,121,707 B2
(45) Date of Patent: Sep. 1, 2015

(54) BENDING VIBRATION PIECE AND ELECTRONIC DEVICE

(75) Inventors: Masashi Shimura, Suwa (JP); Takayuki Kikuchi, Okaya (JP)

(73) Assignee: Seiko Epson Corporation (JP)

( * ) Notice: Subject to any disclaimer, the term of this patent is extended or adjusted under 35 U.S.C. 154(b) by 271 days.

(21) Appl. No.: 13/527,077

(22) Filed: Jun. 19, 2012

(65) Prior Publication Data

US 2012/0325000 A1    Dec. 27, 2012

(30) Foreign Application Priority Data

Jun. 24, 2011    (JP) ................................ 2011-140617

(51) Int. Cl.
  *G01C 19/00*    (2013.01)
  *G01C 19/5621*  (2012.01)
(52) U.S. Cl.
  CPC ................................ *G01C 19/5621* (2013.01)
(58) Field of Classification Search
  CPC .............................................. G01C 19/5607
  USPC ...................................................... 73/504.16
  See application file for complete search history.

(56) References Cited

U.S. PATENT DOCUMENTS

| | | | |
|---|---|---|---|
| 4,898,032 A | 2/1990 | Voles | |
| 5,396,144 A | 3/1995 | Gupta et al. | |
| 7,528,533 B2 | 5/2009 | Ochi et al. | |
| 7,975,545 B2 | 7/2011 | Noguchi et al. | |
| 2005/0011267 A1* | 1/2005 | Kikuchi | 73/649 |
| 2006/0070442 A1* | 4/2006 | Kawauchi et al. | 73/504.12 |
| 2006/0230828 A1* | 10/2006 | Inoue et al. | 73/504.15 |
| 2007/0017288 A1 | 1/2007 | Sato | |
| 2008/0236281 A1 | 10/2008 | Noguchi et al. | |
| 2010/0164331 A1 | 7/2010 | Yamada | |
| 2011/0187470 A1* | 8/2011 | Yamada | 331/155 |
| 2011/0187471 A1* | 8/2011 | Fukuda | 331/158 |
| 2012/0038251 A1 | 2/2012 | Yamada | |

FOREIGN PATENT DOCUMENTS

| | | |
|---|---|---|
| CN | 1904552 A | 1/2007 |
| CN | 101666646 A | 3/2010 |
| CN | 101771395 A | 7/2010 |
| JP | 64-031015 | 2/1989 |
| JP | 03-044613 U | 4/1991 |
| JP | 07-055479 | 3/1995 |
| JP | 10-170272 | 6/1998 |
| JP | 2002/039760 | 2/2002 |

(Continued)

*Primary Examiner* — Hezron E Williams
*Assistant Examiner* — Tarun Sinha
(74) *Attorney, Agent, or Firm* — Harness, Dickey & Pierce, P.L.C.

(57) ABSTRACT

A bending vibration piece has a pair of drive vibration arms and a pair of detection vibration arms in an opposite direction thereto which are connected to a supporting part. The supporting part has recessed portions formed on both lateral parts in a direction of width, and a through-hole formed substantially at the center in a plane part of the supporting part and more toward the drive vibration arms than the recessed portions are. On a surface of the supporting part, drive electrode pads are arranged toward the drive vibration arms and detection electrode pads are arranged toward the detection vibration arms, with these electrode pads being separated from each other in a longitudinal direction by the recessed portions on both lateral part of the supporting part and the through-hole in the plane part.

9 Claims, 8 Drawing Sheets (56) References Cited

FOREIGN PATENT DOCUMENTS

| JP | 2003-166828 | | 6/2003 |
| JP | 2004-251663 | | 9/2004 |
| JP | 2006-275636 | A | 10/2006 |
| JP | 2007-163200 | A | 6/2007 |
| JP | 2008-175632 | | 7/2008 |
| JP | 2008-197033 | A | 8/2008 |
| JP | 2008-249489 | A | 10/2008 |
| JP | 2009-222475 | | 10/2009 |
| JP | 2010-286468 | A | 12/2010 |
| WO | WO 2006/075764 | | 7/2006 |

* cited by examiner

BENDING VIBRATION PIECE AND ELECTRONIC DEVICE

BACKGROUND

1. Technical Field

The present invention relates to a bending vibration piece and various electronic devices using a bending vibration piece.

2. Related Art

According to related arts, in various electronic devices such as digital still camera, video camera, navigation device, vehicle body attitude detection device, pointing device, game controller, mobile phone and head-mounted display, a piezoelectric vibration gyro using a bending vibration piece is widely used as a sensor for detecting physical quantities such as angular velocity, angular acceleration, acceleration and forces. Bending vibration pieces of various structures for piezoelectric vibration gyro are developed and proposed. For example, a double-side tuning fork-type bending vibration piece for angular velocity sensor including two forked members as a driven pair and detection pair connected by a base is known (see, for example, JP-A-64-31015).

Also, a double-side tuning fork-type rotational speed sensor in which a pair of drive excitation branches and a pair of detection pickup branches are connected to one side and the other side of a frame and in which the frame is connected via a suspension device to an attachment basal part arranged inside the frame via an aperture is known (see, for example, JP-A-7-55479). Vibration of the excitation branches on which Coriolis acceleration is exerted causes torsion on the frame with temporal change and this distortion is transmitted, vibrating the pickup branches. The attachment basal part is fixed to an attachment structure of a housing with an adhesive or the like. However, the suspension device between the frame and the attachment basal part minimizes the influence of a discrepancy between a coefficient of thermal expansion of a piezoelectric material of the bending vibration piece and a coefficient of thermal expansion of a material of the housing, on the vibration of the tuning forks.

When such a double-side turning fork-type bending vibration piece is downsized, the mass of vibration arms decreases. Therefore, there is a risk that the resulting Coriolis force decreases and causes a reduction in the sensitivity of the angular velocity sensor. Thus, a technique of realizing higher sensitivity of the angular velocity sensor by providing a groove at an end on a supporting part side of the vibration arms, thus reducing the rigidity thereof, then increasing the moment of a drive vibration arm in a driving mode and thus increasing the Coriolis force, or by providing a hole in the supporting part connecting the drive vibration arm and a detection vibration arm, thus lowering the rigidity thereof, and efficiently propagating vibration of the drive vibration arm to the detecting vibration arm, is known (see, for example, JP-A-2004-251663).

As a bending vibration piece for a piezoelectric vibration gyro that is not a double-side tuning fork-type, a so-called double-T structure is known (see, for example, JP-A-2003-166828). This bending vibration piece has a structure in which two drive vibration systems, each being substantially T-shaped and having a pair of drive vibration arms extending in opposite directions, are arranged with bilateral symmetry in relation to a detection vibration system including a pair of detection vibration arms extending in opposite directions from a central supporting part.

Figure 9:
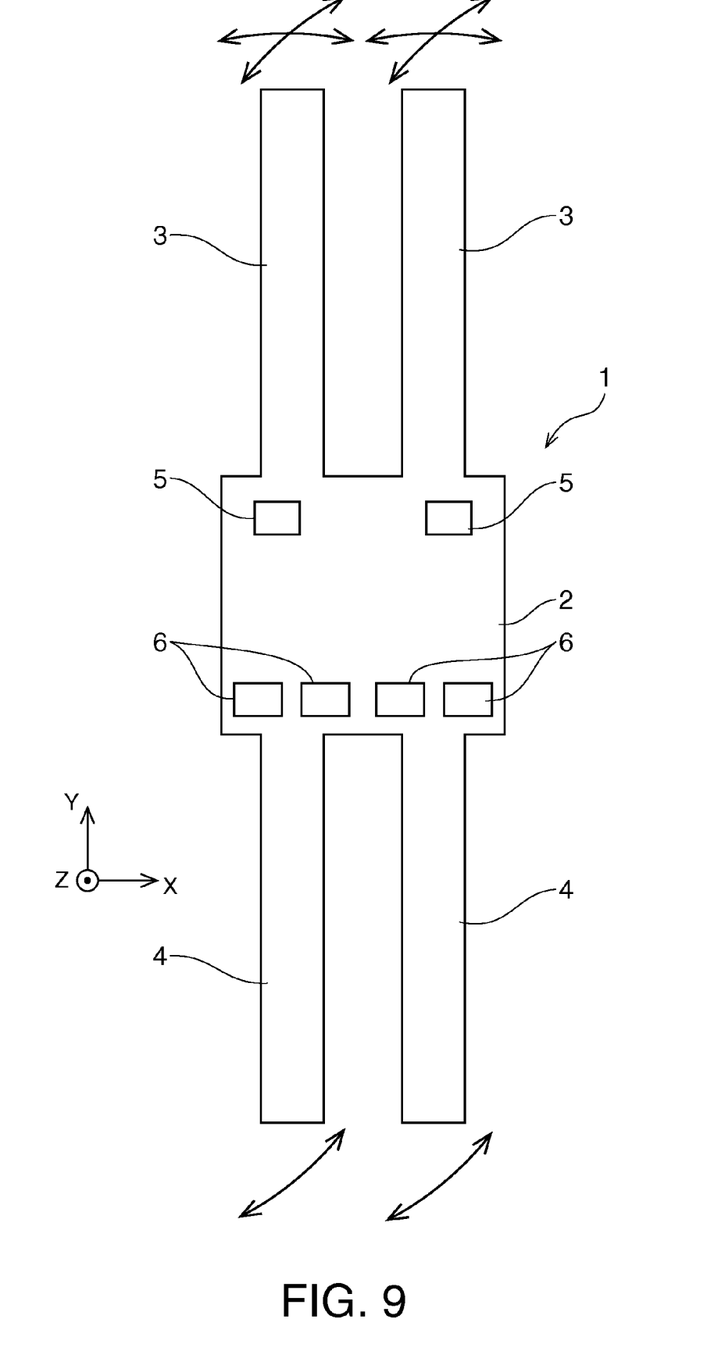
FIG. 9 is a schematic plan view showing a bending vibration piece according to a related art corresponding to the first embodiment.

FIG. 9 schematically shows a typical example of a traditional double-side tuning fork-type bending vibration piece.

In FIG. 9, a bending vibration piece 1 has a pair of drive vibration arms 3 extending parallel to each other on one side from a central supporting part 2, and a pair of detection vibration arms 4 extending parallel to each other on the side opposite to the drive vibration arms 3. On the supporting part 2, drive electrode pads 5 led out from drive electrodes (not shown) of the drive vibration arms 3 are arranged, one each, near a proximal end of each of the drive vibration arms. Moreover, on the supporting part, detection electrode pads 6 led out from detection electrodes (not shown) of the detection vibration arms 4 are arranged, two each, near a proximal end of each of the detection vibration arms.

As a predetermined AC voltage is applied to the drive electrodes of the drive vibration arms 3, the drive vibration arms 3 perform bending vibration in opposite directions to each other within an XY plane that is the same as main surfaces thereof. As the bending vibration piece 1 rotates on a Y axis in a longitudinal direction in this state of driving mode, a Coriolis force corresponding to an angular velocity thereof acts. The drive vibration arms 3 perform bending vibration in opposite directions to each other in Z-axis directions perpendicular to the main surfaces. By resonating with this bending vibration, the detection vibration arms 4 similarly perform bending vibration in opposite directions to each other in Z-axis directions. At this point, by taking out a potential difference generated between the detection electrodes of the detection vibration arms 4 from the detection electrode pads 6, the rotational and angular velocities of the bending vibration piece 1 or the like are found.

Figure 10:
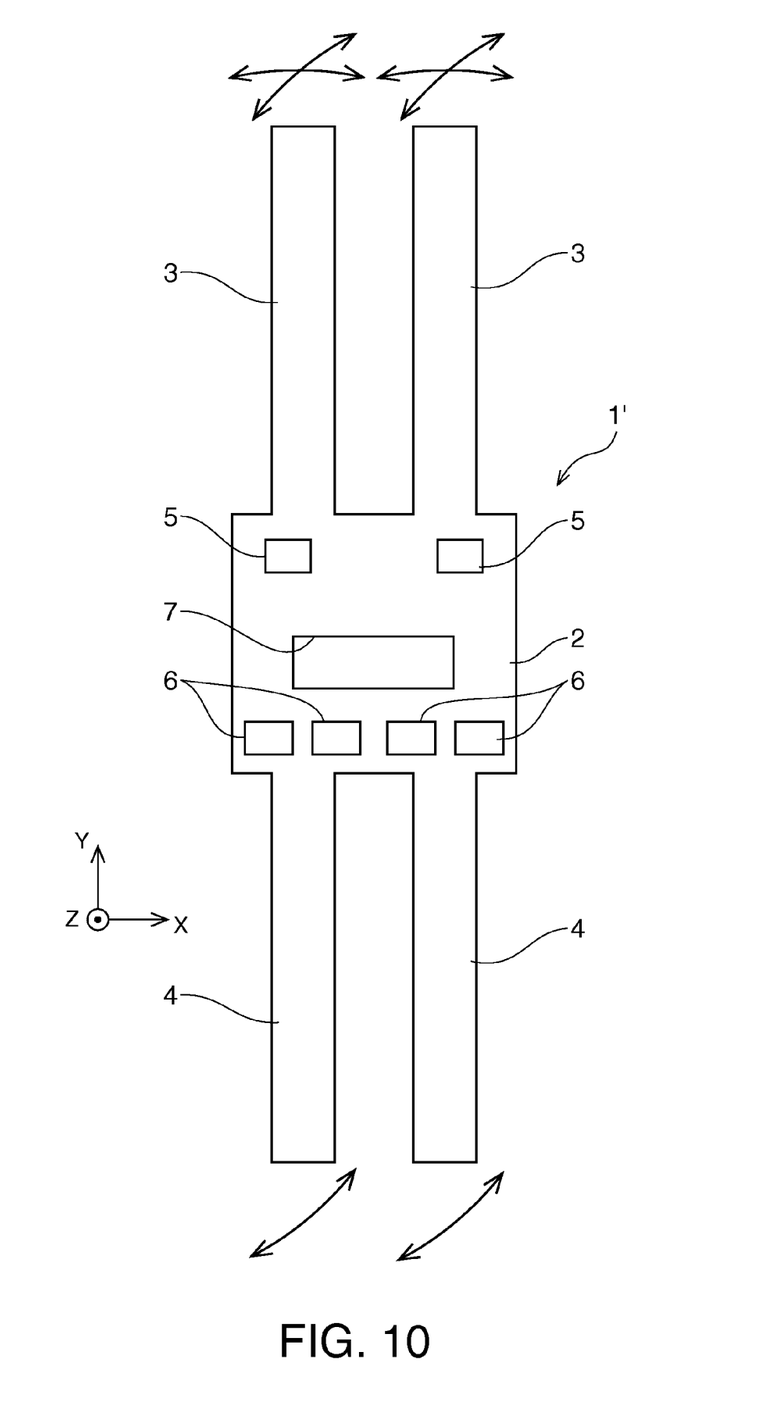
FIG. 10 is a schematic plan view showing a bending vibration piece according to another related art.

FIG. 10 schematically shows a modification of the double-side tuning fork-type bending vibration piece of FIG. 9. In a bending vibration piece 1' of FIG. 10, a rectangular through-hole 7 is formed substantially at the center of the supporting part 2, as described in JP-A-7-55479 and JP-A-2004-251663. Thus, in detection mode, out-of-plane vibration of the drive vibration arms 3 is efficiently propagated to vibrate the detection vibration arms 4 and therefore detection sensitivity of the sensor is improved.

In the state of driving mode in which the drive vibration arms 3 performs in-plane vibration, a detection signal outputted from the detection electrode pads 6 is supposed to be 0 and should preferably be 0. However, in both cases of FIG. 9 and FIG. 10, it is found that when the bending vibration piece 1 is downsized, an error signal is outputted from the detection electrode pads 6 even if the bending vibration piece is not rotating on the Y axis. The output of an error detection signal in driving mode may deteriorate the detection sensitivity and accuracy of the angular velocity sensor.

Particularly when the bending vibration piece is downsized, the supporting part is downsized accordingly. However, the electrode pads formed on the surface of the supporting part need a certain area for connection with external wiring. Therefore, as the plane dimension of the supporting part decreases, the distance between the drive electrode pads and the detection electrode pads decreases and a large electrostatic coupling capacitance is generated between these electrode pads. Moreover, a drive current applied to the drive vibration arms in driving mode is considerably greater than a detection current outputted from the detection electrode pads in detection mode. This large electrostatic coupling capacitance is considered to be one of the causes of the occurrence of the error detection signal.

Since the supporting part is reduced in rigidity by the downsizing, vibration of the drive vibration arms in driving mode propagate to the detection vibration arms more easily. Such unwanted vibration of the detection vibration arms due to the mechanical vibration leakage from the drive vibration arms is considered to be another cause of the occurrence of the error detection signal.

SUMMARY

An advantage of some aspects of the invention is to provide a bending vibration piece in which occurrence of an error detection signal in driving mode can be effectively restrained even when the bending vibration piece is downsized and which is suitable for a high-sensitivity, high-accuracy sensor element such as piezoelectric vibration gyro.

An aspect of the invention is directed to a bending vibration piece including at least one pair of drive vibration arms, one pair of detection vibration arms, a supporting part for supporting the drive vibration arms and the detection vibration arms, a drive electrode arranged on the drive vibration arms, a detection electrode arranged on the detection vibration arms, a drive electrode pad on the supporting part which is connected to the drive electrode, and a detection electrode pad on the supporting part which is connected to the detection electrode. The supporting part has a recessed portion at least one lateral part in a direction of width. The drive electrode pad is arranged more toward the drive vibration arms than the recessed portion is. The detection electrode pad is arranged more toward the detection vibration arms than the recessed portion is.

The recessed portion thus provided on the lateral part in the direction of width of the supporting part limits portions of the supporting part which linearly extend from the drive vibration arms to the detection vibration arms and from the drive electrode pad to the detection electrode pad. Therefore, an electrostatic coupling capacitance generated between the drive electrode pad and the detection electrode pad in driving mode is reduced. Also, a vibration leakage propagating from the drive vibration arms to the detection vibration arms is reduced. Thus, with such a relatively simple configuration, even when the supporting part is downsized, the generation of an electrostatic coupling capacitance in driving mode and the generation of an error detection signal due to a vibration leakage from the drive vibration arms can be restrained effectively.

In one embodiment, a double-side tuning fork-type bending vibration piece in which the one pair of detection vibration arms is made up of two vibration arms extending parallel to each other from the supporting part and in which the at least one pair of drive vibration arms is made up of two vibration arms extending parallel to each other on a side opposite to the detection vibration arms from the supporting part can be realized.

In one embodiment, a so-called double-T bending vibration piece which further includes one pair of connecting arms extending in opposite directions to each other on both sides from the supporting part, with one connecting arm extending from each side, and in which the one pair of detection vibration arms is made up of two vibration arms extending from the supporting part in opposite directions to each other on both sides of directions orthogonal to the directions of extension of the connecting arms, with one vibration arm extending from each side, and in which the at least one pair of drive vibration arms is made up of two pairs of vibration arms extending in opposite directions to each other on both sides of directions orthogonal to the directions of extension of the connecting arms from a distal end part of each connecting arm, with one vibration arm extending from each side, can be realized.

In one embodiment, the recessed portion is provided on both lateral parts in the direction of width of the supporting part. Therefore, an electrostatic coupling capacitance generated between the drive electrode pad and the detection electrode pad in driving mode and the generation of an error detection signal due to a vibration leakage from the drive vibration arms can be restrained with good balance between left and right.

In one embodiment, the recessed portions on both lateral parts in the direction of width of the supporting part are provided to overlap each other in the direction of width thereof. Therefore, portions of the supporting part where linear extension from the drive vibration arms to the detection vibration arms and from the drive electrode pad to the detection electrode pad is allowed are eliminated or significantly limited. Thus, the generation of an electrostatic coupling capacitance in driving mode and the generation of an error detection signal due to a vibration leakage from the drive vibration arms can be restrained effectively.

In one embodiment, the recessed portion on the lateral part of the supporting part is formed in such a way as to penetrate the supporting part in a direction of thickness. Therefore, the generation of an electrostatic coupling capacitance in driving mode and the generation of an error detection signal due to a vibration leakage from the drive vibration arms can be restrained more securely.

In one embodiment, the recessed portion on the lateral part of the supporting part is formed in such a way as not to penetrate the supporting part in a direction of thickness. Therefore, the generation of an electrostatic coupling capacitance in driving mode and the generation of an error detection signal due to a vibration leakage from the drive vibration arms can be restrained without largely reducing the rigidity of the supporting part.

In one embodiment, the supporting part further includes a hole portion formed in a plane part thereof. Therefore, portions of the supporting part where linear extension from the drive vibration arms to the detection vibration arms and from the drive electrode pad to the detection electrode pad is allowed can be limited more than when only the recessed portion is provided on both lateral parts in the direction of width of the supporting part. Thus, the generation of an electrostatic coupling capacitance in driving mode and the generation of an error detection signal due to a vibration leakage from the drive vibration arms can be restrained.

In one embodiment, the hole portion in the plane part of the supporting part is arranged more toward the drive vibration arms than the recessed portion is. According to another embodiment, the hole portion in the plane part of the supporting part can be arranged more toward the detection vibration arms than the recessed portion on the lateral part is. In this manner, the hole portion in the plane part of the supporting part and the recessed portion on the lateral part can be arranged in such a way that the generation of an error detection signal can be restrained optimally, according to setting conditions of the bending vibration piece, the arrangement of the drive and detection electrode pads, and the like.

In one embodiment, the hole portion in the plane part of the supporting part is formed in such a way as to penetrate the supporting part in a direction of thickness. Therefore, the generation of an electrostatic coupling capacitance in driving mode and the generation of an error detection signal due to a vibration leakage from the drive vibration arms can be restrained more securely.

In one embodiment, the hole portion in the plane part of the supporting part is formed in such away as not to penetrate the supporting part in a direction of thickness. Therefore, the generation of an electrostatic coupling capacitance in driving mode and the generation of an error detection signal due to a vibration leakage from the drive vibration arms can be restrained without largely reducing the rigidity of the supporting part.

Another aspect of the invention is directed to an electronic device including the bending vibration piece according to the above aspect. Therefore, an electronic device which has high-sensitivity, high-accuracy sensor capability and can be downsized can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail with reference to the accompanying drawings. In the accompanying drawings, the same or similar elements are denoted by the same or similar reference numerals.

Figure 1:
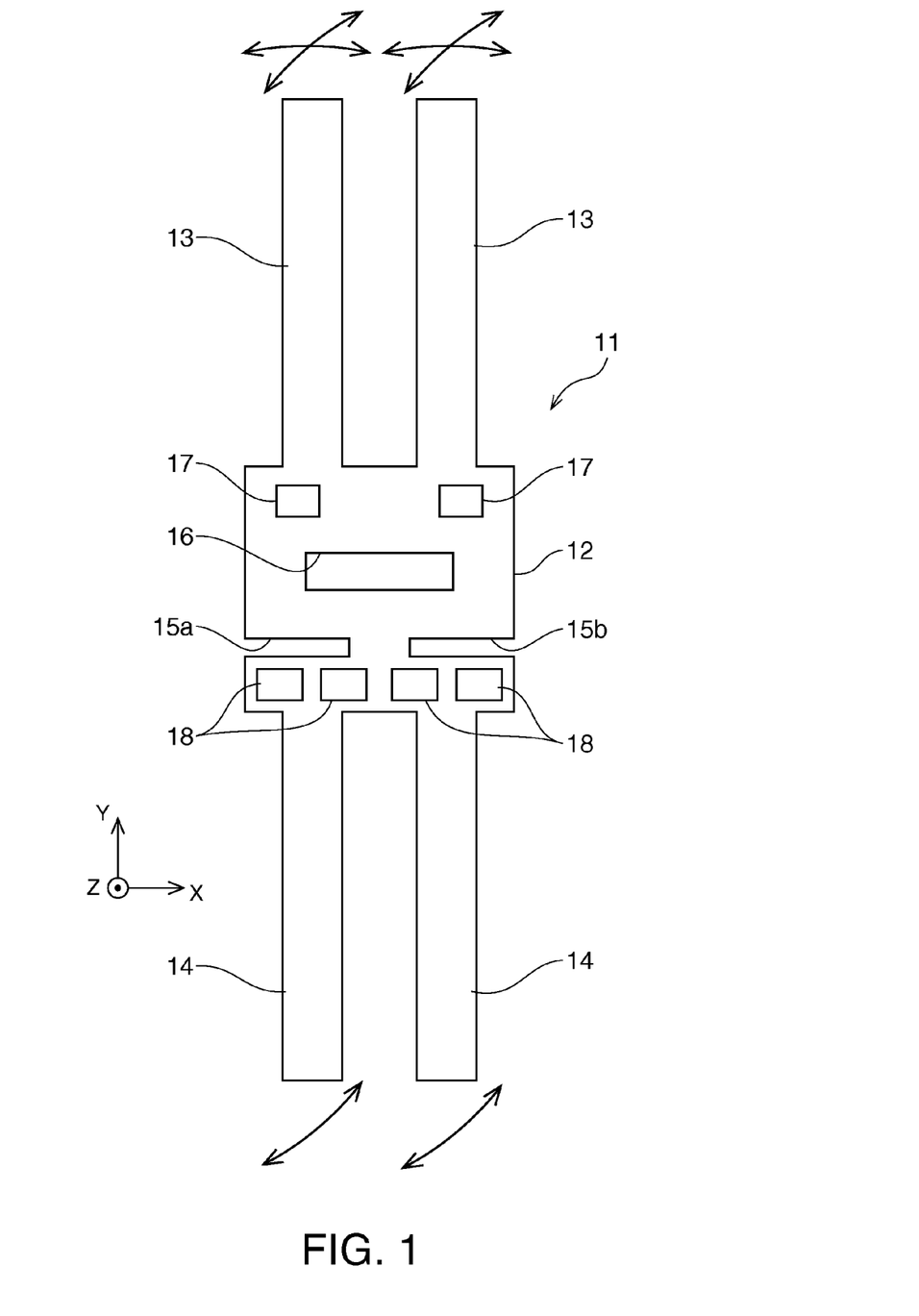
FIG. 1 is a schematic plan view showing a bending vibration piece according to a first embodiment of the invention.

FIG. 1 schematically shows a double-side tuning fork-type bending vibration piece 11 according to a first embodiment of the invention. The bending vibration piece 11 has a roughly rectangular supporting part 12 at the center, and a pair of drive vibration arms 13 and a pair of detection vibration arms 14 supported by the supporting part 12. The drive vibration arms 13 extend parallel to each other on one side from the supporting part 12. The detection vibration arms 14 extend parallel to each other on the opposite side. A drive electrode (not shown) is formed in the drive vibration arms 13 in order to cause the drive vibration arms to perform bending vibration in directions toward and away from each other within an XY plane that is the same as main surfaces of the drive vibration arms, in driving mode. A detection electrode (not shown) is formed in the detection vibration arms 14 in order to detect a potential difference generated when the detection vibration arms perform bending vibration in opposite directions to each other in Z-axis directions perpendicular to main surfaces of the detection vibration arms, in detection mode.

On the supporting part 12, recessed portions 15a, 15b are provided at both lateral parts in a direction of width of the supporting part 12. The recessed portions 15a, 15b are formed with bilateral symmetry in the shape of elongate grooves extending from each lateral part of the supporting part and penetrating the supporting part in a direction of the thickness of the supporting part and arranged closer to the detection vibration arms 14. Moreover, a through-hole 16 is provided substantially at the center of a plane part of the supporting part. The through-hole 16 is formed in the shape of an elongate rectangle in the direction of width of the supporting part, and is arranged more toward the drive vibration arms than the recessed portions 15a, 15b are. The recessed portions 15a, 15b and the through-hole 16 are dimensioned and arranged in such a way as to partly overlap each other in the direction of width of the supporting part.

On a surface of the supporting part 12, two drive electrode pads 17 led out from the drive electrodes of the drive vibration arms 13 are arranged, one each, near proximal ends thereof and more the toward the drive vibration arms than the through-hole 16 is. On the surface of the supporting part, four detection electrode pads 18 led out from the detection electrodes of the detection vibration arms 14 are arranged, two each, near proximal ends thereof and more toward the detection vibration arms than the recessed portions 15a, 15b are. The drive electrode pads 17 and the detection electrode pads 18 are separated from each other in a longitudinal direction by the recessed portions 15a, 15b and the through-hole 16 on the supporting part.

In driving mode, as a predetermined AC voltage is applied to the drive electrodes from the drive electrode pads 17, the drive vibration arms 13 perform bending vibration in opposite directions to each other within the XY plane that is the same as the main surfaces of the drive vibration arms 13. As the bending vibration piece 11 rotates on a Y axis in the longitudinal direction in this state, a Coriolis action generated according to the angular velocity thereof causes the drive vibration arms 13 to perform bending vibration in opposite directions to each other in Z-axis directions perpendicular to the main surfaces. Resonating with this vibration, the detection vibration arms 14 perform bending vibration in opposite directions to each other similarly in Z-axis directions. As a potential difference generated between the detection electrodes is taken out from the detection electrode pads 17, the rotational and angular velocities of the bending vibration piece 11 or the like are found.

As described above, the drive electrode pads 17 and the detection electrode pads 18 are separated from each other in the longitudinal direction by the recessed portions and the through-hole on the supporting part 12. Thus, even when the supporting part 12 is downsized, an electrostatic coupling capacitance generated between the drive electrode pads and the detection electrode pads can be restrained effectively to a small capacitance.

A vibration leakage caused by in-plane vibration of the drive vibration arms 13 in driving mode is alleviated since components propagating through a central area of the supporting part 12 are shut off by the through-hole 16 while components propagating through left and right sides of the through-hole 16 are offset when being blocked by the two recessed portions 15a, 15b and getting around to the inner side from left and right directions. Therefore, even when the rigidity of the supporting part 12 is reduced by the downsizing, the occurrence of an error detection signal due to a vibration leakage from the drive vibration arms 13 in driving mode can be restrained effectively.

Particularly in this embodiment, since the recessed portions 15a, 15b and the through-hole 16 are provided in such a way as to partly overlap each other in the direction of width of the supporting part, the supporting part 12 has no portions where linear extension from the drive vibration arms 13 to the detection vibration arms 14 and from the drive electrode pads 17 to the detection electrode pads 18 is allowed. Thus, the electrostatic coupling capacitance and the occurrence of an error detection signal due to a vibration leakage can be restrained effectively.

Figure 2:
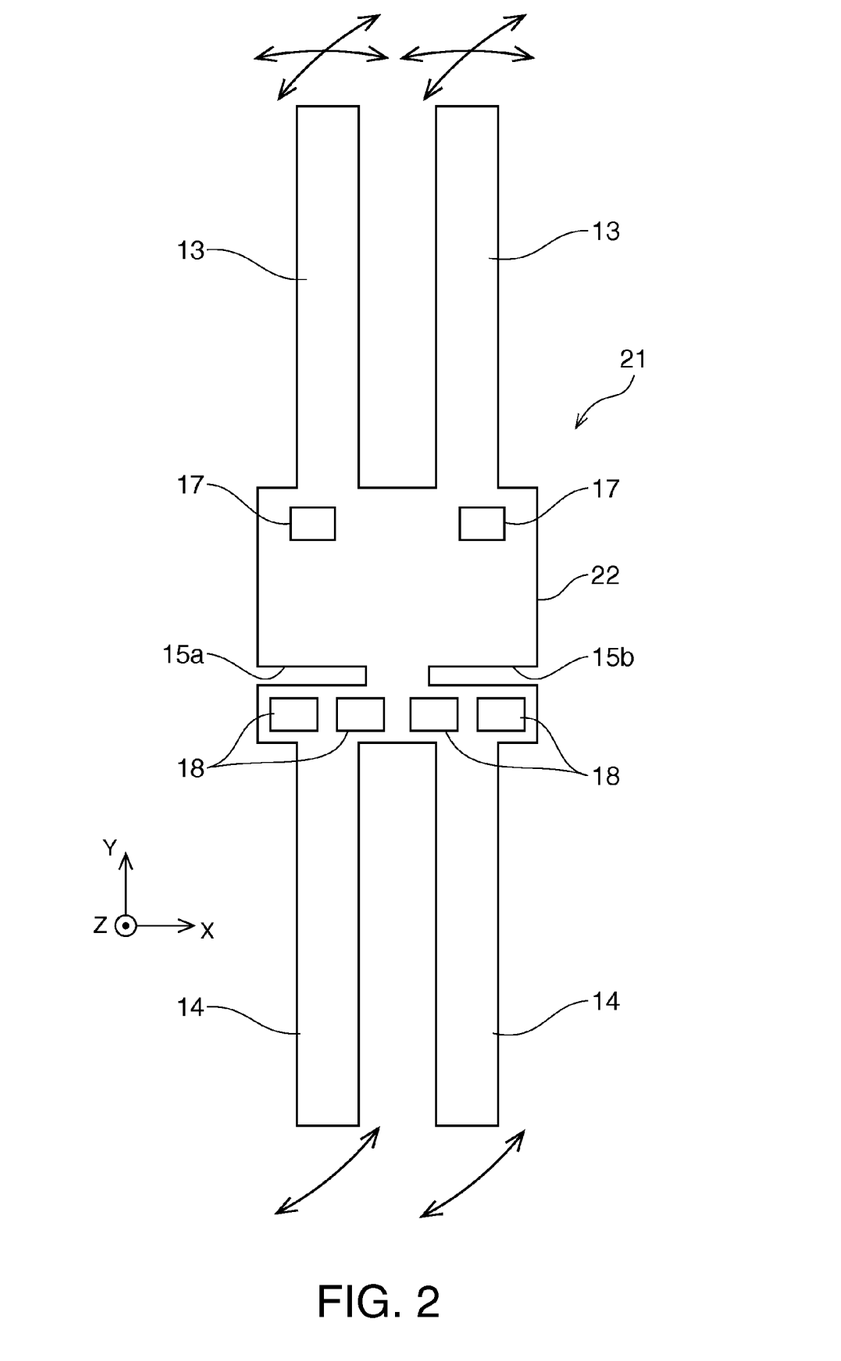
FIG. 2 is a schematic plan view showing a second embodiment as a modification.

FIG. 2 schematically shows a double-side tuning fork-type bending vibration piece 21 according to a second embodiment of the invention. The bending vibration piece 21 of this embodiment is different from the first embodiment in that a supporting part 22 thereof has no through-hole 16 in the supporting part 12 of the first embodiment. Therefore, the supporting part 22 is easier in configuration and working and higher in rigidity than the first embodiment.

The drive electrode pads 17 and the detection electrode pads 18 are separated from each other in the longitudinal direction by the recessed portions 15a, 15b on the supporting part 22. Thus, even when the supporting part is downsized, an electrostatic coupling capacitance generated between the drive electrode pads and the detection electrode pads can be restrained effectively to a small capacitance.

Also, a vibration leakage caused by in-plane vibration of the drive vibration arms 13 in driving mode is offset and alleviated when being blocked by the two recessed portions 15a, 15b and getting around to the inner side from left and right directions. Components propagating through a central area of the supporting part 22 are propagated directly toward the detection vibration arms 14. However, the occurrence of an error detection signal due to a vibration leakage from the drive vibration arms in driving mode can be restrained, compared with the related arts.

Particularly in this embodiment, the recessed portions 15a, 15b are provided in such a way that the detection electrode pads 18 and the detection vibration arms 14 are situated behind the recessed portions 15a, 15b, as viewed in the longitudinal direction. Therefore, in the supporting part 22, portions where linear extension from the drive vibration arms 13 to the detection vibration arms 14 and from the drive electrode pads 17 to the detection electrode pads 18 is allowed are significantly limited. Thus, the electrostatic coupling capacitance and the occurrence of an error detection signal due to a vibration leakage can be restrained effectively.

Figure 3:
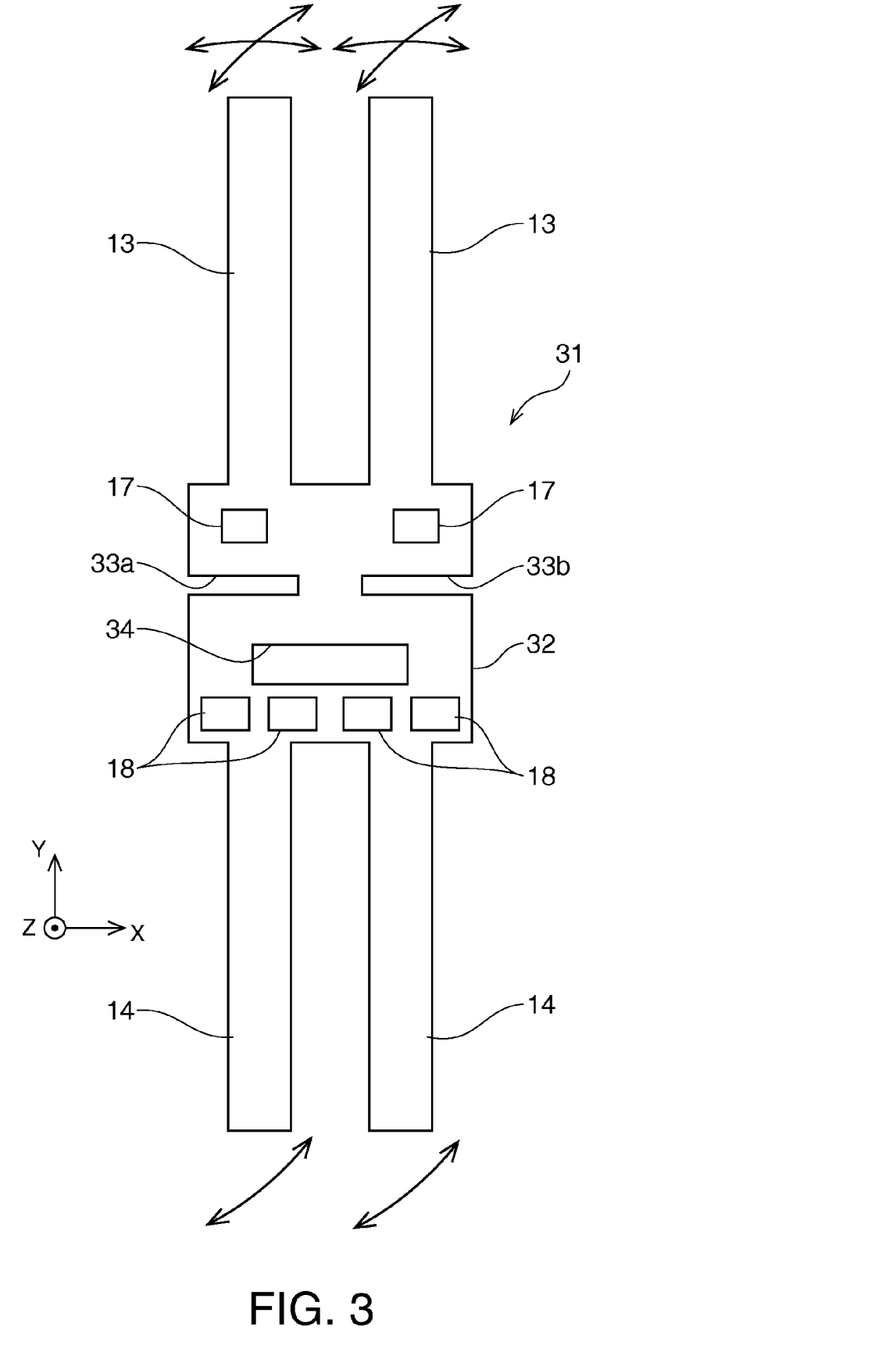
FIG. 3 is a schematic plan view showing a third embodiment as another modification.

FIG. 3 schematically shows a double-side tuning fork-type bending vibration piece 31 according to a third embodiment of the invention. On a supporting part 32 of this bending vibration piece 31, recessed portions 33a, 33b corresponding to the recessed portions 15a, 15b of the first embodiment are arranged toward the drive vibration arms 13, and a through-hole 34 corresponding to the through-hole 16 of the first embodiment is arranged toward the detection vibration arms 14. The recessed portions 33a, 33b and the through-hole 34 are dimensioned and arranged in such a way as to partly overlap each other in the direction of width of the supporting part.

In this way, the drive electrode pads 17 and the detection electrode pads 18 are separated from each other in the longitudinal direction by the recessed portions 33a, 33b and the through-hole 34 on the supporting part as in the first embodiment. Thus, even when the supporting part 32 is downsized, an electrostatic coupling capacitance generated between the drive electrode pads and the detection electrode pads can be restrained effectively to a small capacitance.

Also, a vibration leakage caused by in-plane vibration of the drive vibration arms 13 in driving mode is alleviated, since the vibration leakage is offset when being blocked by the two recessed portions 33a, 33b and getting around to the inner side from left and right directions, and then becomes shut off by the through-hole 34 from a central area of the supporting part 32 and propagates through left and right lateral sides. Therefore, the occurrence of an error detection signal due to a vibration leakage from the drive vibration arms in driving mode can be restrained, compared with the related arts.

Particularly in this embodiment, since the recessed portions 33a, 33b and the through-hole 34 are provided in such a way as to partly overlap each other in the direction of width of the supporting part, the supporting part 32 has no portions where linear extension from the drive vibration arms 13 to the detection vibration arms 14 and from the drive electrode pads 17 to the detection electrode pads 18 is allowed. Thus, the electrostatic coupling capacitance and the occurrence of an error detection signal due to a vibration leakage can be restrained effectively.

With the bending vibration pieces 11 to 31 according to the first to third embodiments, an error detection current outputted from the detection electrode pads 18 is simulated when the bending vibration piece is not rotating on the Y axis in driving mode where the drive vibration arms 13 are performing in-plane vibration. For comparison, with the related art examples of FIGS. 9 and 10, an error detection current outputted from the detection electrode pads 6 is simulated similarly when the bending vibration piece 1, 1' is not rotating on the Y axis in driving mode.

Figure 4:
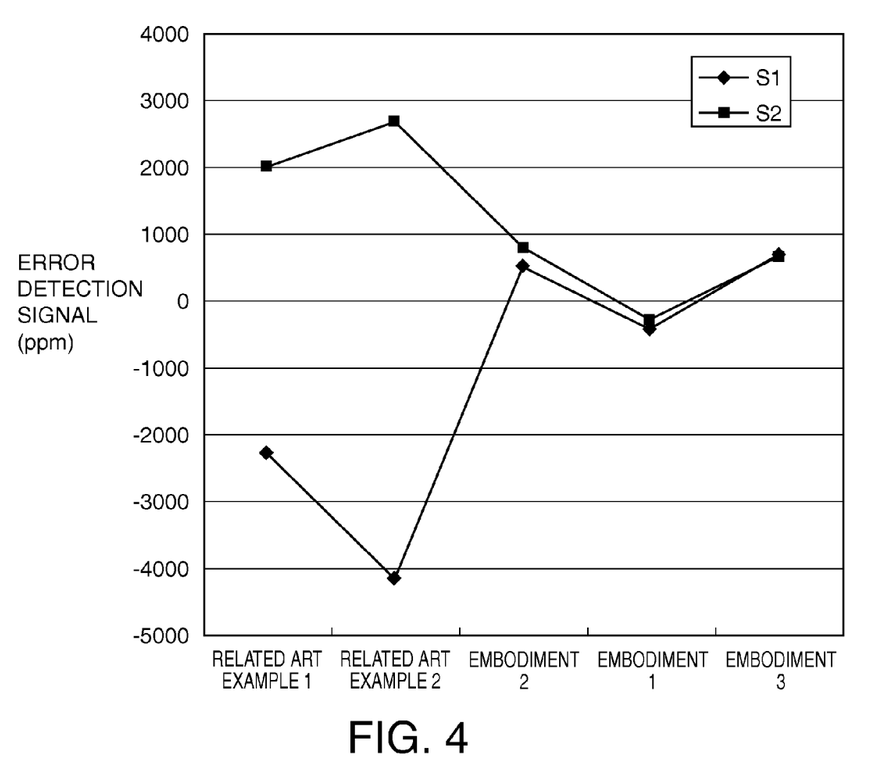
FIG. 4 is a chart showing a comparison of the magnitude of an error detection current in driving mode between the first to third embodiments and related-art examples.

FIG. 4 shows a comparison of the results of the simulation with the first to third embodiments and the related art examples. In FIG. 4, the vertical axis represents the rate of a detection current outputted from the detection electrode pads 18 in relation to a drive current applied to the drive electrode pads 17, as converted into ppm. S1 shows the magnitude of an error detection signal from one detection vibration arm. S2 shows the magnitude of an error detection signal from the other detection vibration arm.

As shown in FIG. 4, the first embodiment has the smallest error detection signals. In the second and third embodiments, the error detection signals are larger than in the first embodiment but show small enough values for practical use. Both the error detection signals S1, S2 have negative values in the first embodiment, whereas both the error detection signals S1, S2 have positive values in the second and third embodiments. In each case, S1 and S2 have roughly the same value.

Meanwhile, the error detection signals in each of the related art examples show greater values by 2.5 times or more than in any of the embodiments of the invention. Moreover, in each of the related art examples, one error detection signal (S1) has a negative value and the other error detection signal (S2) has a positive value. In terms of absolute values, the one (S1) is greater than the other (S2). Based on the results of the simulation, it can be understood that, according to the invention, the occurrence of an error detection signal in driving mode can be restrained very effectively.

Figure 5:
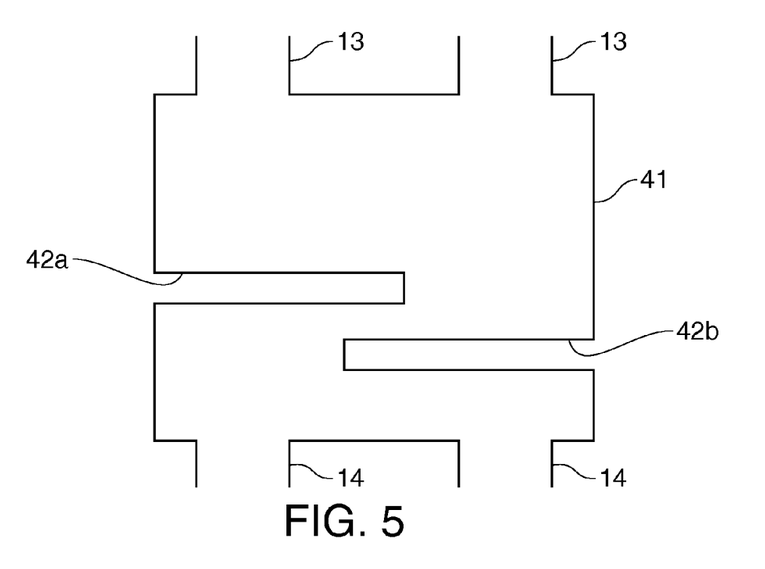
FIG. 5 is a partially enlarged plan view of a supporting part with a recessed portion as a modification.

The recessed portions of the supporting part can also be provided with bilateral asymmetry about the center in the longitudinal direction. FIG. 5 schematically shows essential parts of a supporting part according to such a modification. In a supporting part 41 of this embodiment, two recessed portions 42a, 42b in the shape of longer grooves than in each of the above embodiments are formed alternately in the longitudinal direction, one each from each lateral part of the supporting part, and in such a way as to overlap each other in the direction of width. Thus, the supporting part 41 has no portions where linear extension from the drive vibration arms 13 to the detection vibration arms 14 is allowed. The drive electrode pads and the detection electrode pads are separated from each other in the longitudinal direction.

Figure 6:
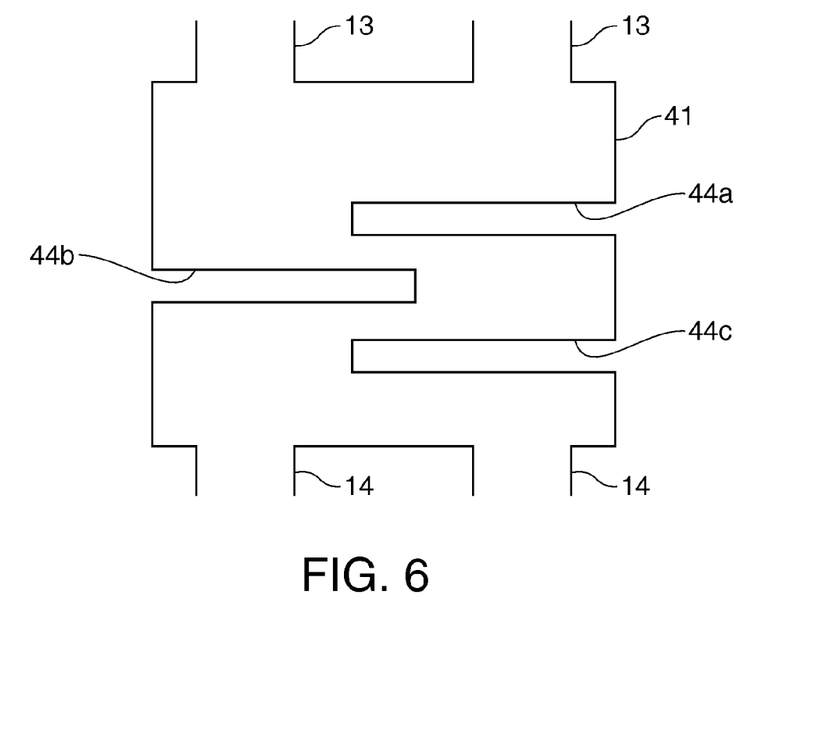
FIG. 6 is a partially enlarged plan view of a supporting part with a recessed portion as another modification.

FIG. 6 schematically shows essential parts of a supporting part according to another modification, in which the recessed portions are provided with bilateral asymmetry. In a supporting part 43 of this embodiment, three recessed portions 44a to 44c in the shape of longer grooves than in the first to third embodiments are formed alternately in the longitudinal direction, one each from each lateral part of the supporting part, and in such a way as to overlap each other in the direction of width. Thus, the drive electrode pads and the detection electrode pads are securely separated from each other in the longitudinal direction on the supporting part 43. Also, according to another embodiment, four or more recessed portions can be provided on the lateral parts of the supporting part and the dimensions thereof can be varied diversely.

Figure 7:
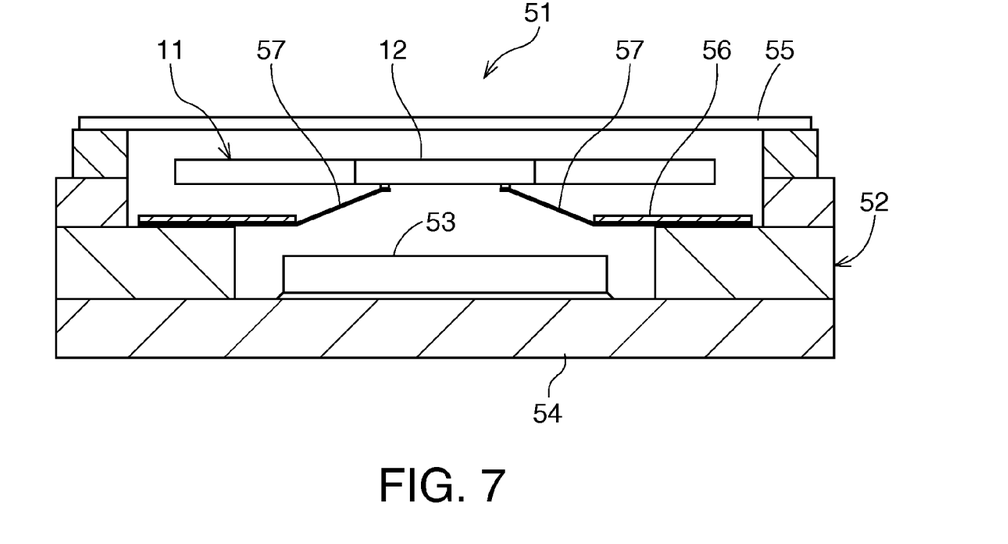
FIG. 7 is a schematic sectional view showing an angular velocity sensor on which the bending vibration piece according to the first embodiment is mounted.

FIG. 7 schematically shows an angular velocity sensor 51 equipped with the double-side tuning fork-type bending vibration piece 11 of the first embodiment. The angular velocity sensor 51 has, inside a package 52, the bending vibration piece 11 as a piezoelectric vibration gyro element and an IC chip 53 which performs drive control of the bending vibration piece 11. The package 52 has a rectangular box-shaped base 54 and a metallic lid 54 that is airtightly joined to an upper edge of the base. The IC chip 53 is fixed to a vacant bottom part defined within the base 54.

The bending vibration piece 11 is horizontally fixed and supported by a metal tab tape 57, above a polyimide resin substrate 56 arranged horizontally above the IC chip 53. In the bending vibration piece 11, bumps are provided on the electrode pads 17, 18 on the supporting part 12. The bending vibration piece 11 is arranged with a forming surface of the electrode pads facing downward. The tap tape 57 is bent from the polyimide resin substrate 56 and extended obliquely upward, as illustrated. As the bumps are welded to a distal end of the tab tape 57, the tab tape 57 is electrically connected to the electrode pads 17, 18 on the supporting part.

The polyimide resin substrate is connected to the IC chip 53 and an external electrode on an outer surface of the package via internal wiring of the package 52. As a predetermined drive voltage is applied from the external circuit and a power supply which are connected via this external electrode, the bending vibration piece 11 accurately vibrates at a predetermined frequency.

According to another embodiment, the bending vibration piece 11 can be fixed by having a lower surface of the supporting part 12 directly bonded to an upper surface of the IC chip 53, for example, with an insulative epoxy-based resin adhesive.

Figure 8:
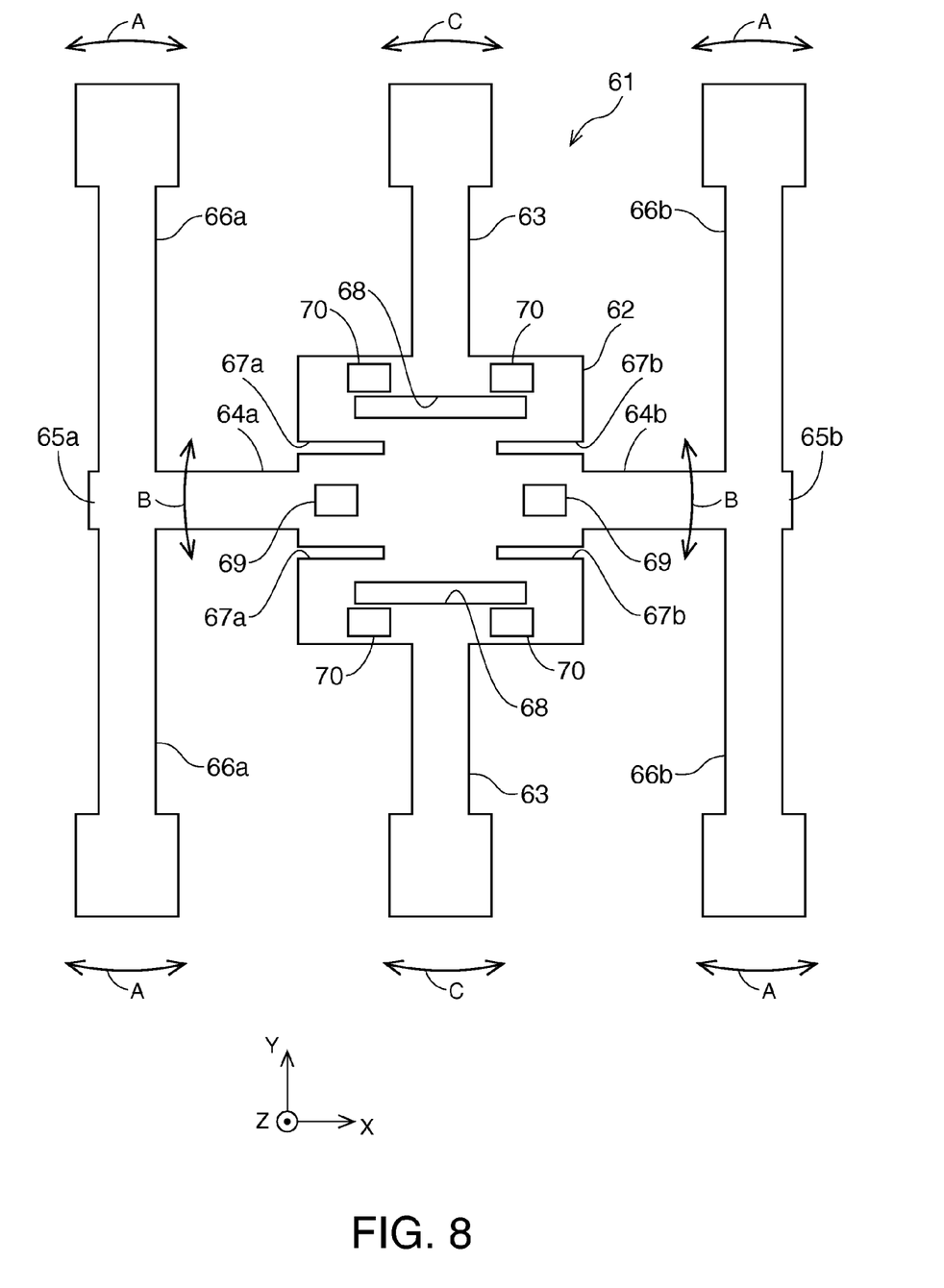
FIG. 8 is a schematic plan view showing a bending vibration piece according to a fourth embodiment of the invention.

The invention can also be applied to a bending vibration piece that is not a double-side tuning fork type. FIG. 8 schematically shows a bending vibration piece according to a fourth embodiment of the invention, having the above-described double-T structure. A bending vibration piece 61 has a central supporting part 62, a pair of detection vibration arms 63, a pair of connecting arms 64a, 64b and a pair of drive vibration arms 66a, 66b on each of the left and right sides which are supported by the supporting part 62. The detection vibration arms 63 extend both upward and downward in FIG. 8. The drive vibration arms 66a, 66b extend both upward and downward in FIG. 8 parallel to the detection vibration arms, from basal parts 65a, 65b which are distal end parts of the connecting arms 64a, 64b extending both rightward and leftward in FIG. 8 orthogonally to the detection vibration arms from the supporting part. A detection electrode (not shown) is provided on a surface of each of the detection vibration arms. A drive electrode (not shown) is provided on a surface of each of the drive vibration arms.

On both left and right lateral parts of the supporting part 62, recessed portions 67a, 67b are provided with bilateral symmetry between each detection vibration arm 63 and the connecting arms 64a, 64b on both left and right sides. The recessed portions 67a, 67b are formed with bilateral symmetry in the shape of elongate grooves extending in the direction of width from each lateral part of the supporting part and penetrating the supporting part in the direction of thickness, and are arranged toward the connecting arms. Moreover, in a plane part of the supporting part, a rectangular through-hole 68 elongate in left and right directions is provided at a substantially central position between each detection vibration arm 63 and the recessed portions 67a, 67b which are close to the detection vibration arm 63 . The recessed portions 67a, 67b and the through-holes 68 are dimensioned and arranged in such a way as to partly overlap each other in the direction of width of the supporting part.

On the surface of the supporting part 62, two drive electrode pads 69 led out from the drive electrodes of each of the left and right pairs of drive vibration arms 66a, 66b are arranged, one each, near proximal ends of the connecting arms. Moreover, on the surface of the supporting part, four detection electrode pads 70 are arranged, two each, near proximal ends of the detection vibration arms. The drive electrode pads 69 and detection electrode pads 70 are separated in up and down directions by the recessed portions 67a, 67b and the through-holes 68 on the supporting part.

In driving mode, as a predetermined AC voltage is applied to the drive electrodes from the drive electrode pads 69, the drive vibration arms 66a, 66b perform bending vibration as indicated by arrows A within a XY plane that is the same as main surfaces of the drive vibration arms 66a, 66b. As the bending vibration piece 61 rotates on a Z axis within the XY plane in this state, a Coriolis force occurs alternately in opposite directions along the longitudinal direction of the drive vibration arms. This action causes the connecting arms 64a, 64b to perform bending vibration as indicated by arrows B similarly in the XY plane. This bending vibration is transmitted via the supporting part 62 and causes the detection vibration arms 63 to perform bending vibration as indicated by arrows C similarly in the XY plane. As a potential difference generated between the detection electrodes by the bending vibration of the detection vibration arms is taken out from the detection electrode pads 70, the rotational and angular velocities of the bending vibration piece 61 about the Z axis and the like are found.

Also in this embodiment, the drive electrode pads 69 and the detection electrode pads 70 are separated from each other in up and down directions by the recessed portions 67a, 67b and the through-holes 68 on the supporting part 62, as described above. Therefore, even when the supporting part 62 is downsized, an electrostatic coupling capacitance generated between the drive electrode pads and the detection electrode pads can be restrained effectively to a small capacitance.

A vibration leakage caused by in-plane vibration of the drive vibration arms 66a, 66b in driving mode is alleviated since the vibration leakage is offset when being blocked by both left and right recessed portions 67a, 67 and getting around to the inner side from left and right directions, and then components passing through a central area of the supporting part 62 are shut off by the through-holes 68 and propagate through left and right sides of the through-holes 68. Thus, the occurrence of an error detection signal due to a vibration leakage from the drive vibration arms in driving mode can be restrained.

Also in this embodiment, since the recessed portions 67a, 67b and the through-holes 68 are provided in such a way as to partly overlap each other in the direction of width of the supporting part, the supporting part 62 has no portions where linear extension from the drive vibration arms 66a, 66b to the detection vibration arms 63 via the connecting arms 64a, 64b and from the drive electrode pads 69 to the detection electrode pads 70 is allowed. Thus, the electrostatic coupling capacitance and the occurrence of an error detection signal due to a vibration leakage can be restrained effectively.

According to another embodiment, the recessed portions provided on lateral parts of the supporting part can be formed with a closed-bottomed without penetrating the supporting part in the direction of the thickness thereof. Also, the through-holes provided on the plane part of the supporting part can be altered to closed-bottom holes. Thus, the occurrence of an electrostatic coupling capacity and the occurrence of an error detection signal due to a vibration leakage from the drive vibration arms in driving mode can be restrained without significantly lowering the rigidity of the supporting part.

According to still another embodiment, the recessed portions provided at the lateral parts of the supporting part and the through-holes or closed-bottom holes provided on the plane part can be set to such dimensions that these parts do not overlap each other in the direction of width of the supporting part. Moreover, the recessed portions and the through-holes or closed-bottom holes can be formed in various different shapes than the shapes of the above embodiments.

The invention is not limited to the above embodiments and various modifications or changes can be made within the technical scope of the invention. For example, the bending vibration piece according to the invention can be applied to a sensor element for detecting physical quantities such as angular acceleration, acceleration and forces, other than angular velocity. Also, the bending vibration piece according to the invention can be made of piezoelectric single crystals such as lithium tantalate and lithium niobate, piezoelectric materials such as piezoelectric ceramics including lead titanate zirconate, or silicon semiconductor materials, other than crystal. Moreover, the bending vibration piece according to the invention can be broadly applied as a sensor element in electronic devices such as digital still camera, video camera, navigation device, vehicle attitude detection device, pointing device, game controller, mobile phone, and head-mounted display.

The entire disclosure of Japanese Patent Application No. 2011-140617, filed Jun. 24, 2011 is expressly incorporated by reference herein.

What is claimed is:

1. A bending vibration piece comprising:
   at least one pair of drive vibration arms;
   one pair of detection vibration arms;
   a supporting part for supporting the drive vibration arms and the detection vibration arms;
   a through-hole provided in the supporting part, the through-hole penetrating the supporting part;
   a first recess provided in the supporting part, the first recess being located adjacent to a first edge of the supporting part;
   a drive electrode arranged on the drive vibration arms;
   a detection electrode arranged on the detection vibration arms;
   a drive electrode pad provided on a main surface of the supporting part, the drive electrode pad being connected to the drive electrode; and
   a detection electrode pad provided on the main surface of the supporting part, the detection electrode pad being connected to the detection electrode, wherein
   the drive electrode pad is arranged more toward the drive vibration arms than the first recess,
   the detection electrode pad is arranged more toward the detection vibration arms than the first recess,
   the through-hole is located between the drive electrode pad and the detection electrode pad, and
   the through-hole and the first recess are partially overlapped with each other in an extending direction of the first edge of the supporting part.

2. The bending vibration piece according to claim 1, further comprising one pair of connecting arms extending in opposite directions to each other, each of the connecting arms extending from each of the first edge and a second edge of the supporting part, wherein the one pair of detection vibration arms is configured with two vibration arms extending from the supporting part in opposite directions to each other, an extending direction of the detection vibration arms is orthogonal to an extending direction of the connecting arms, and the at least one pair of drive vibration arms is configured with two pairs of vibration arms extending in opposite directions to each other, an extending direction of the vibration arms is orthogonal to the extending direction of the connecting arms.

3. The bending vibration piece according to claim 1, further comprising:
   a second recess that is provided in the supporting part, the second recess being located adjacent to a second edge, which is opposite to the first edge, of the supporting part.

4. The bending vibration piece according to claim 1, wherein the first recess is formed in such a way as to penetrate the supporting part.

5. The bending vibration piece according to claim 1, wherein the through-hole provided in the supporting part is arranged more toward the detection vibration arms than the first recess.

6. An electronic device comprising the bending vibration piece according to claim 1.

7. An electronic device comprising the bending vibration piece according to claim 2.

8. An electronic device comprising the bending vibration piece according to claim 3.

9. An electronic device comprising the bending vibration piece according to claim 4.

* * * * *